United States Patent
Park

(10) Patent No.: US 8,120,806 B2
(45) Date of Patent: Feb. 21, 2012

(54) COMMUNICATION PORT, AND METHOD FOR PROVIDING A COMMUNICATION PORT

(75) Inventor: Hyun-wook Park, Gwacheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 976 days.

(21) Appl. No.: 12/052,277

(22) Filed: Mar. 20, 2008

(65) Prior Publication Data

US 2009/0009796 A1 Jan. 8, 2009

(30) Foreign Application Priority Data

Jul. 4, 2007 (KR) .................. 10-2007-0067055

(51) Int. Cl.
*G06F 3/12* (2006.01)
*G06K 15/00* (2006.01)

(52) U.S. Cl. ...................... 358/1.15; 358/1.13

(58) Field of Classification Search ............. 358/1.15, 358/1.13, 1.14, 1.16, 1.18, 1.1
See application file for complete search history.

(56) References Cited

U.S. PATENT DOCUMENTS

| | | | |
|---|---|---|---|
| 5,075,874 A * | 12/1991 | Steeves et al. | 358/1.13 |
| 6,940,615 B1 * | 9/2005 | Shima | 358/1.15 |
| 7,460,264 B2 * | 12/2008 | Chikuma et al. | 358/1.15 |
| 2002/0083431 A1 * | 6/2002 | Machida | 717/174 |
| 2003/0105643 A1 * | 6/2003 | Chen et al. | 705/1 |
| 2003/0174360 A1 * | 9/2003 | Ohshima | 358/1.15 |
| 2004/0145779 A1 * | 7/2004 | Kuribayashi | 358/1.16 |
| 2004/0160631 A1 * | 8/2004 | Schlonski et al. | 358/1.15 |
| 2004/0179225 A1 * | 9/2004 | Hopp | 358/1.15 |
| 2004/0236862 A1 * | 11/2004 | Ito et al. | 709/230 |
| 2005/0280861 A1 * | 12/2005 | Shima et al. | 358/1.15 |
| 2006/0253824 A1 * | 11/2006 | Iizuka | 716/11 |

* cited by examiner

*Primary Examiner* — Dov Popovici
(74) *Attorney, Agent, or Firm* — Staas & Halsey LLP

(57) ABSTRACT

A host device to provide a communication port. The host device includes a port information identifying unit which sends a request to an image forming device for port information regarding a plurality of communication ports, and a control unit which uses the identified port information to set one of the communication ports having the highest transmission rate as a connection communication port using the port information regarding each of the communication ports.

25 Claims, 5 Drawing Sheets

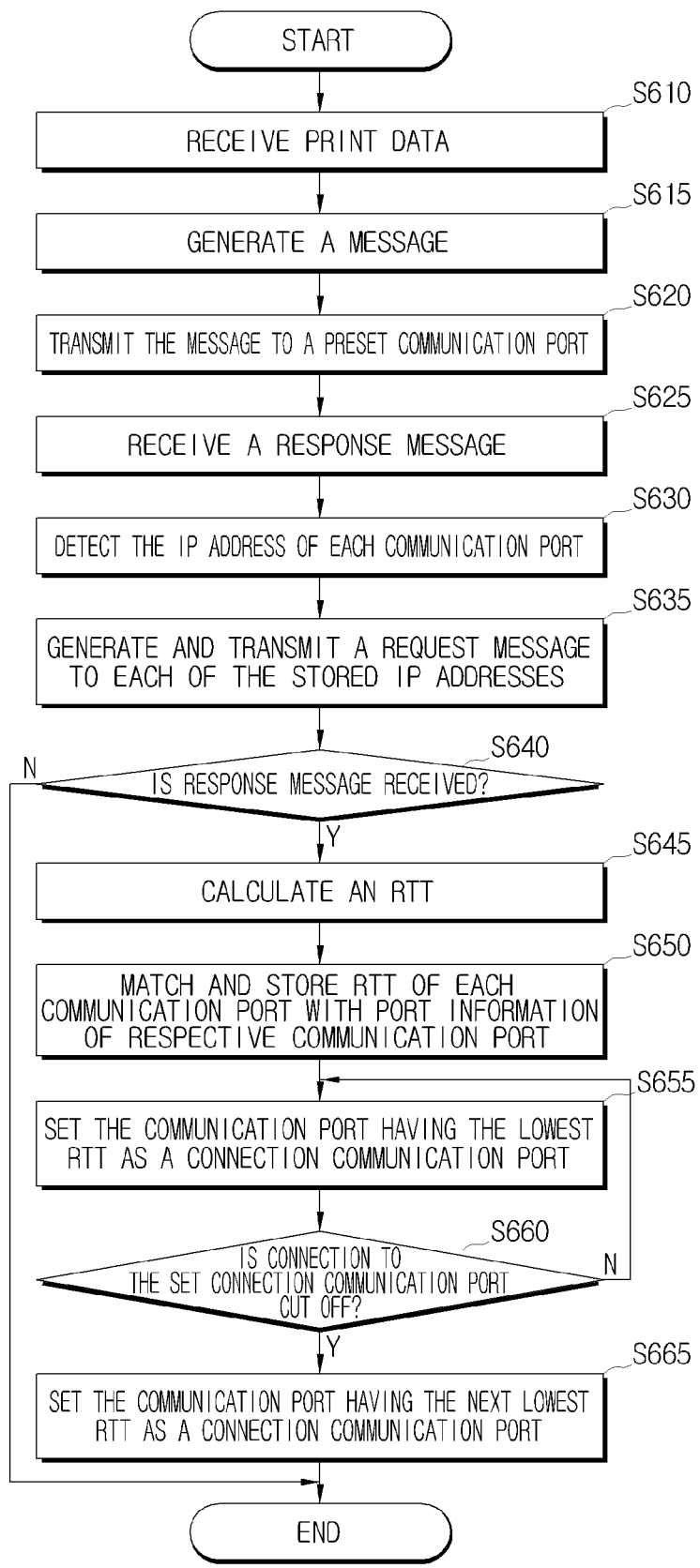

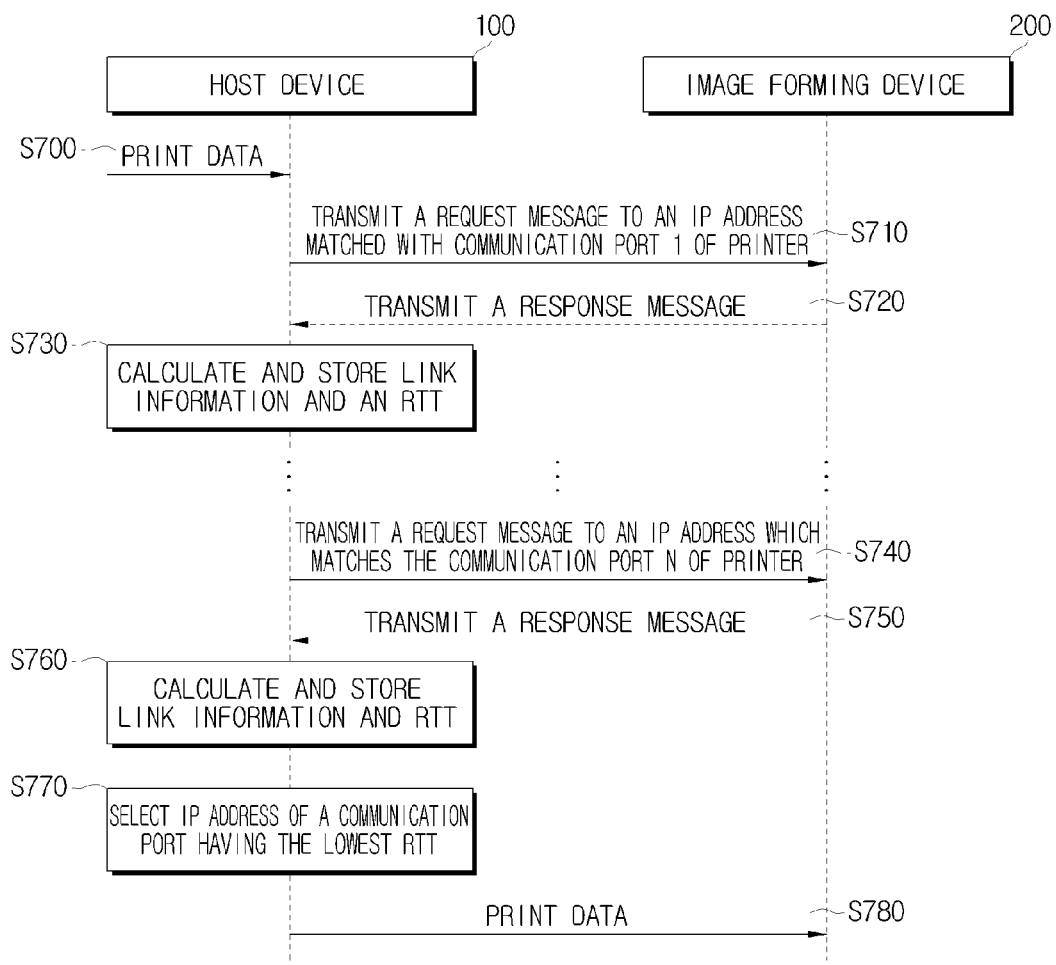

COMMUNICATION PORT, AND METHOD FOR PROVIDING A COMMUNICATION PORT

CROSS-REFERENCE TO RELATED APPLICATIONS

This application claims all benefits accruing under 35 U.S.C. § 119 from Korean Patent Application No. 2007-67055, filed on Jul. 4, 2007, in the Korean Intellectual Property Office, the entire disclosure of which is incorporated herein by reference.

BACKGROUND OF THE INVENTION

1. Field of the Invention

Aspects of the present invention relate to an image forming device having multi-ports, a host to provide a communication port, and methods to provide a communication port, and more particularly to an image forming device which provides information on multi-ports, a host to provide an optimum communication port using the information on multi-ports provided from the image forming device, and methods to provide a communication port.

2. Description of the Related Art

Modern image forming devices are implemented with a network system which is connected to a plurality of hosts, such as computers, over the network. By connecting an image forming device to a plurality of hosts via the network system, many users can use the image forming device, resulting in reduced costs, increased utility, and greater efficiency of the image forming device.

Network image forming devices are connected to the network in various ways through multi-ports. For example, network image forming devices may be connected through multi-ports using a single common Internet Protocol (IP) address and a single common Media Access Control (MAC) address, or may be connected using an IP address and a MAC address for each network port using a multi-homing method.

In the conventional multi-homing method, a user selects an IP address of a multi-port provided by an image forming device, and manually adds the selected IP address to a driver for the image forming device, which is saved in a host device. This process of manually adding selected IP addresses is burdensome.

Moreover, in the conventional multi-homing method, the user selects and uses an IP address provided by the driver of the image forming device as a print port. However, if the selected IP address is not accessible in the network, printing cannot be performed. In this case, the user is required to add another print port to the driver in order to perform the printing operation, which is inconvenient. Furthermore, if the user does not know the IP address of another print port, the user cannot use the image forming device.

Additionally, in the conventional multi-homing method, when print data is transmitted from the host device over the network, each print port has a different transmission rate according to a routing path and port type. However, the user may be unable to determine the transmission rates of the respective print ports. Consequently, the user may use a print port having a low transmission rate, even though a print port having a higher transmission rate is available.

SUMMARY OF THE INVENTION

Aspects of the present invention relate to an image forming device in which information is provided on multi-ports, a host to provide an optimum communication port using the information on multi-ports provided from the image forming device, and methods to provide a communication port.

Additional aspects and/or advantages of the invention will be set forth in part in the description which follows and, in part, will be obvious from the description, or may be learned by practice of the invention.

According to an aspect of the present invention, a method to provide a communication port for a host device which is connected to an image forming device having a plurality of the communication ports includes identifying port information regarding each of the communication ports, and setting a connection communication port, through which the host device communicates with the image forming device to perform a printing operation, using the port information regarding each of the communication ports.

According to an aspect of the present invention, the identifying of the port information includes requesting the port information from the image forming device or from a server which controls a network connecting the image forming device and the host device and which stores the port information.

According to an aspect of the present invention, the requesting of the port information includes transmitting request messages corresponding to the communication ports requesting the port information of the communication ports to the image forming device or the server.

According to an aspect of the present invention, the port information is requested when the printing operation is initiated, or is requested periodically.

According to an aspect of the present invention, in the setting of the connection communication port, a communicable and high-speed port from among the communication ports is set as the connection communication port.

According to an aspect of the present invention, the setting of the connection communication port includes setting a communication port having a fastest communication speed from among the communication ports as the connection communication port.

According to an aspect of the present invention, a priority indicating which of the communication ports is set as the connection communication port is determined using response messages responding to the corresponding request messages.

According to an aspect of the present invention, the priority is determined using a round trip time (RTT) of each communication port included in the respective response messages.

According to an aspect of the present invention, the method further includes setting a communication port having a lowest RTT among the communication ports as a highest priority to be used as the connection communication port, and setting a communication port having a next lowest RTT as a next highest priority to be used as the connection communication port if a connection to the set connection communication port having the lowest RTT is cut off.

According to an aspect of the present invention, the response message includes an IP address of each of the communication ports, a number of communication ports, first time information regarding a time when the port information is requested, and second time information regarding a time when the port information is transmitted.

According to another aspect of the present invention, a method to provide a communication port for an image forming device which has a plurality of the communication ports and is connected to a host device over a network includes receiving request messages corresponding to the communication ports requesting port information regarding the communication ports from the host device, generating response messages containing the port information regarding the communication ports in response to the corresponding request messages, and transmitting the generated response message to the host device, wherein the response messages are used to set one of the communication ports as a connection communication port through which the host device communicates with the image forming device to perform a printing operation.

According to another aspect of the present invention, each of the response messages includes an IP address of each of the communication ports, a number of communication ports, first time information regarding a time when the port information is requested, and second time information regarding a time when the port information is transmitted.

According to still another aspect of the present invention, a host device which is connected to an image forming device having a plurality of communication ports over the network includes a port information identifying unit which identifies port information regarding the communication ports of the image forming device, and a control unit which uses the identified port information to set one of the communication ports as a connection communication port to be used by the image forming device to receive print data from the host device and perform a printing operation.

According to still another aspect, the port information identifying unit includes a message processing unit which transmits request messages requesting the port information to the image forming device, or to a server which controls a network connecting the image forming device and the host device and which stores the port information, and a storage unit which receives and stores response messages sent in response to the transmitted request messages.

According to still another aspect, the message processing unit transmits the request messages requesting the port information when a command to perform the printing operation is input to the host device, or transmits the requested messages periodically.

According to still another aspect, the control unit displays communication ports which have communication speeds greater than a reference value from among the communication ports, enables a user to select one of the displayed ports, and sets the selected port as the connection communication port.

According to still another aspect, the control unit determines a priority indicating which of the communication ports is set as the connection communication port using the response messages responding to the request messages.

According to still another aspect, the host device further includes a calculation unit which calculates a round trip time (RTT) of each of the communication ports using the port information regarding each of the communication ports contained in the corresponding response messages, wherein the control unit determines the priority of each of the communication ports using the calculated RTTs.

According to still another aspect, the control unit sets a communication port having a lowest RTT among the communication ports as a highest priority to be used as the connection communication port, and sets a communication port having a next lowest RTT as a next highest priority to be used as the connection communication port if a connection to the set connection communication port having the lowest RTT is cut off.

According to still another aspect, each of the response messages includes an IP address of each of the communication ports, a number of the communication ports, first time information regarding a time when the port information is requested, and second time information regarding a time when the port information is transmitted.

In addition to the example embodiments and aspects as described above, further aspects and embodiments will be apparent by reference to the drawings and by study of the following descriptions.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a flow chart describing the method shown in FIG. 5 in more detail; and FIG. 7 is a flow chart showing a method to provide a communication port to transmit and receive messages between a host device and an image forming device.

Throughout the drawings, like reference numerals will be understood to refer to like parts, components and structures.

DETAILED DESCRIPTION OF EXEMPLARY EMBODIMENTS OF THE PRESENT INVENTION

Aspects of the present invention will be described more fully hereinafter with reference to the accompanying drawings, in which preferred embodiments of the invention are shown.

Figure 1:
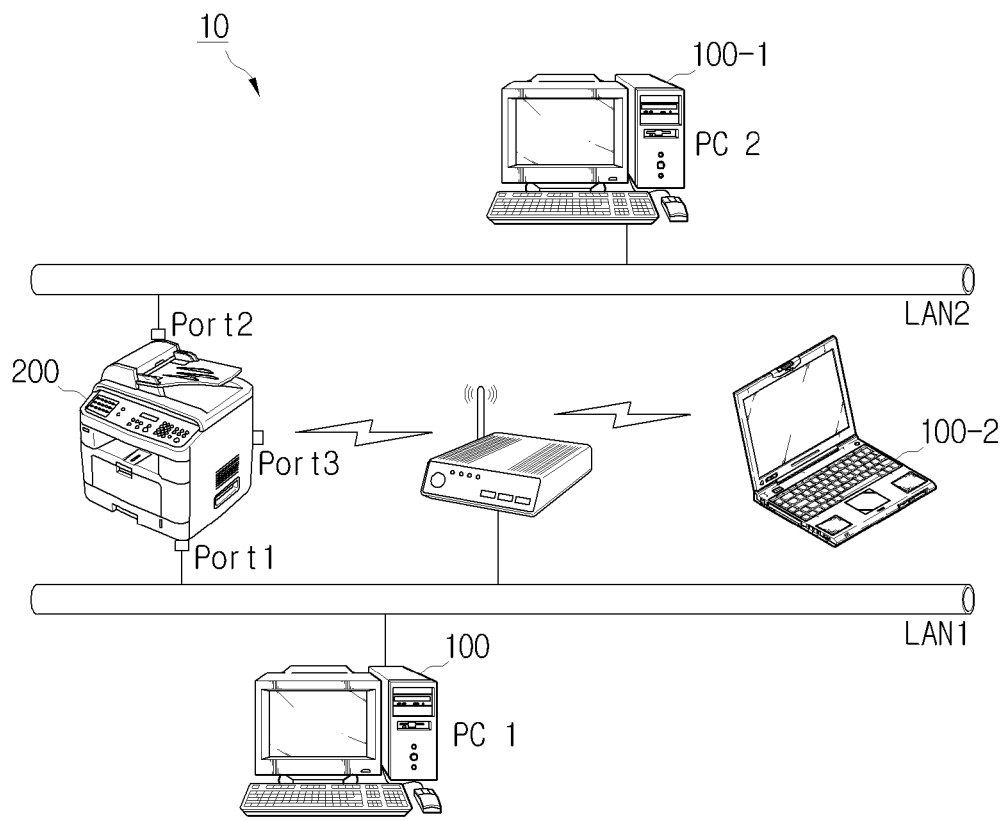
FIG. 1 is a diagram showing the structure of a network connecting host devices and an image forming device.

FIG. 1 is a diagram showing the structure of a network 10 connecting host devices and an image forming device. In FIG. 1, an image forming device 200 is networked with a plurality of host devices 100, 100-1, and 100-2 using a wired or wireless local area network (LAN). It is understood more or less than the three host devices 100, 100-1, and 100-2 may be connected to the network 10.

The image forming device 200 has a plurality of communication ports, and provides each of the host devices 100, 100-1, and 100-2 with access to the plurality of communication ports to perform printing, faxing and other types of image forming operations. The image forming device 200 may be a printer, a facsimile, a multifunction machine, etc. According to an aspect of the present invention, the host device has an optimum communication port to transmit and receive request messages and response messages.

Figure 2:
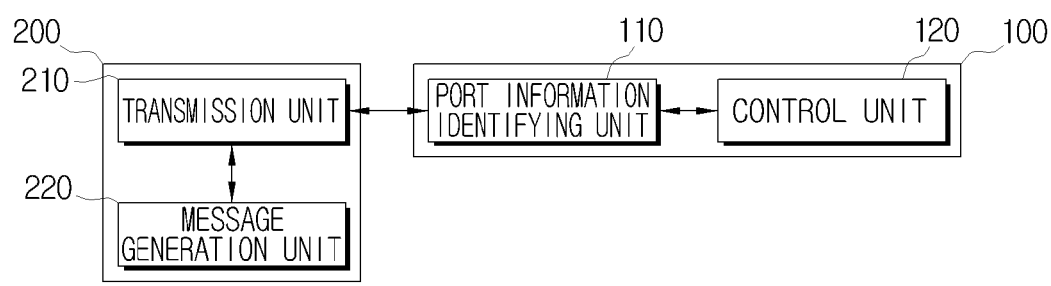
FIG. 2 is a block diagram showing the configuration of a host device and an image forming device, which is connected to the host device over the network shown in FIG. 1, according to an embodiment of the present invention.

FIG. 2 is a block diagram showing the configuration of the host device 100 and the image forming device 200, which is connected to the host device 100 over the network 10, according to an embodiment of the present invention. In FIG. 2, the host device 100 includes a port information identifying unit 110 and a control unit 120. The image forming device 200, which is connected to the host device 100 via the network, includes a transmission unit 210 and a message generation unit 220.

The port information identifying unit 110 identifies port information regarding a plurality of communication ports of the image forming device 200. According to an aspect of the present invention, the port information is identified by transmitting a port information request message 400 (FIG. 4A) to the image forming device 200 and receiving the port information from the image forming device 200. Port information may be identified using pre-stored port information which is stored in the image forming device 200.

The port information may include various types of information, such as, for example, information on the number of communication ports in the image forming device 200, and the IP address, network connectivity state and network transmission rate of each of the communication ports. The request for the port information is transmitted in the form of a request message 400 (FIG. 4A) written according to a network transmission protocol.

If a command to print is input to the host device 100, the port information identifying unit 110 sends the request message 400 to the image forming device 200 to obtain port information. One of a plurality of communication ports is set as a connection communication port, and then print data is transmitted to the image forming device 200. If the communication port of the image forming device 200 is connected to the host device 100 over the network, the host device 100 requests and updates port information periodically according to user settings.

Alternatively, the port information identifying unit 110 may send the request message 400 to a server (not shown) to obtain the port information. The server controls the network 10 connecting the host devices 100, 100-1, and 100-2 to the image forming device 200. For example, the server (not shown) stores the network information, that is, information regarding ports which are connectable between the host device 100 and the image forming device 200.

The transmission unit 210 of the image forming device 200 receives the request message 400 requesting the port information from the host device 100 through one of the communication ports. The message generation unit 220 identifies the received request message 400, and generates a response message 410 (FIG. 4B) including the port information regarding the communication ports in the image forming device 200.

According to an aspect of the present invention, the response message 410 includes the IP address of each of the communication ports, the number of the communication ports, first time information regarding the time when the port information is requested, and second time information regarding the time when the port information is transmitted. The transmission unit 210 transmits the response message 410 generated in the message generation unit 220 to an IP address of the host device 100.

The control unit 120 of the host device 100 determines the communication port that has the highest transmission rate using the port information contained in the response message 410 received from the transmission unit 210 of the image forming device 200. Based on this determination, the control unit 120 sets the communication port having the highest transmission rate to be a connection communication port. If there is a plurality of communication ports having a transmission rate greater than a pre-set reference rate, the plurality of communication ports is displayed on a screen of the host device 100 and the user can select one of the plurality of communication ports as a connection communication port.

Figure 3:
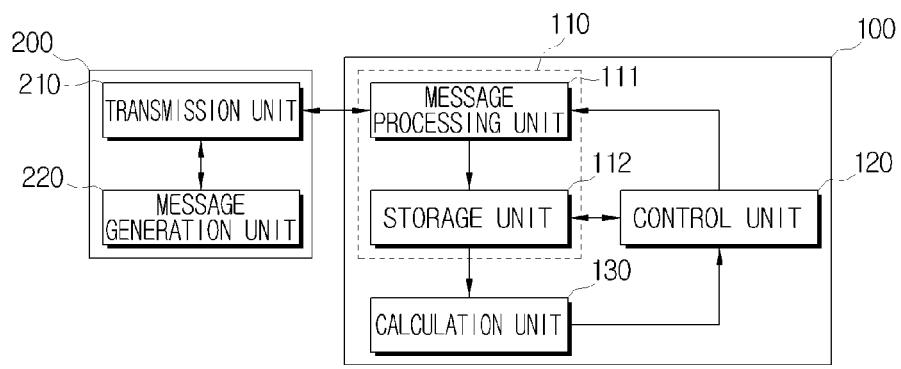
FIG. 3 is a block diagram showing the configuration of the host device and the image forming device shown in FIG. 2 in more detail.

FIG. 3 is a block diagram showing in more detail the configuration of the host device and the image forming device shown in FIG. 2 in more detail. With reference to FIG. 3, the host device 100 further includes a calculation unit 130, and the port information identifying unit 110 includes a message processing unit 111 and a storage unit 112.

Figure 4A:
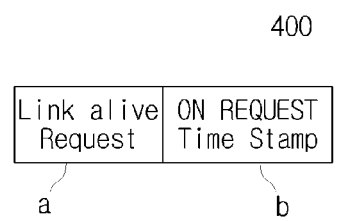
FIGS. 4A and 4B show the structure of a request message and a response message according to an embodiment of the present invention.

The message processing unit 111 generates a request message requesting port information regarding the transmission ports in the image forming device 200. As shown in FIG. 4A, the request message 400 includes information (a), represented by the "Link alive Request" box, which is used to request network connectivity of a corresponding communication port, and first time information (b), represented by the "ON REQUEST time stamp" box, which is information regarding the time when the request message is transmitted. The request message 400 further includes a header (not shown) containing a destination address, that is, an IP address of the communication port.

The message processing unit 111 transmits the request message 400 to a pre-connected communication port. The storage unit 112 receives and stores the response message 410 transmitted in response to the request message 400. According to an aspect of the present invention, the response message 410 includes information on the number of communication ports in the image forming device 200, the IP address of each of the communication ports, and port information regarding the communication type of the respective communication ports, for example, wired or wireless communication.

The control unit 120 detects and stores IP addresses of the communication ports from the stored response message 410 transmitted from the transmission unit 210 in the image forming device 200. The control unit 120 operates the port information identifying unit 110 to generate and transmit a request message 400 directed to each of the stored IP addresses. If a response message 410 for each IP address is received, the calculation unit 130 calculates the round trip time (RTT) of each communication port using port information regarding the communication port contained in the various response messages 410 corresponding to each of the IP addresses.

Figure 4B:
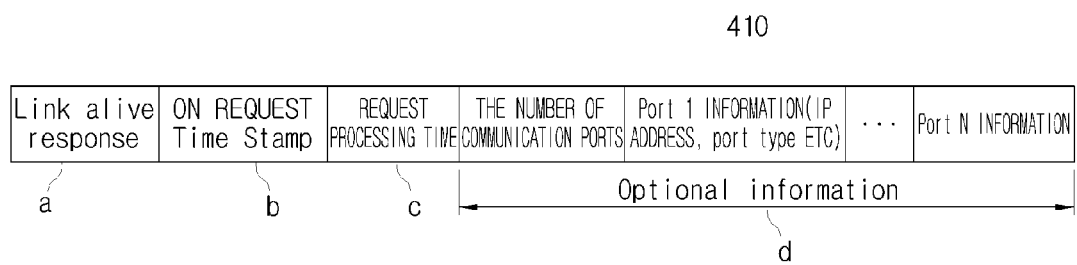

FIG. 4B illustrates the structure of the response message 410 according to an aspect of the present invention. With reference to FIG. 4B, the response message 410 includes the information (a) which is used to request network connectivity of a corresponding communication port and first time information (b) of the request message 400, and further includes a request process time (c), i.e., second time information, which is represented by the "request processing time" box. Additionally, the response message 410 may further include optional information, such as the number of communication ports and IP addresses of each communication port.

The calculation unit 130 calculates the RTT using the first time information (b) regarding the time when the request message is transmitted, and the second time information (c) regarding the time when the response message is transmitted. The control unit 120 operates the storage unit 112 to store the RTT of each communication port together with the port information of each communication port, and sets the communication port having the lowest RTT as a connection communication port. If connection to the set connection communication port is cut off, the control unit 120 sets the communication port having the next lowest RTT among the stored RTTs in the storage unit 112 as a connection communication port. Furthermore, it is understood that the control unit 120 may set the communication ports according to other types of criteria besides RTTs, such as, for example, types of connectivity (e.g., wired or wireless), IP addresses, etc.

Figure 5:
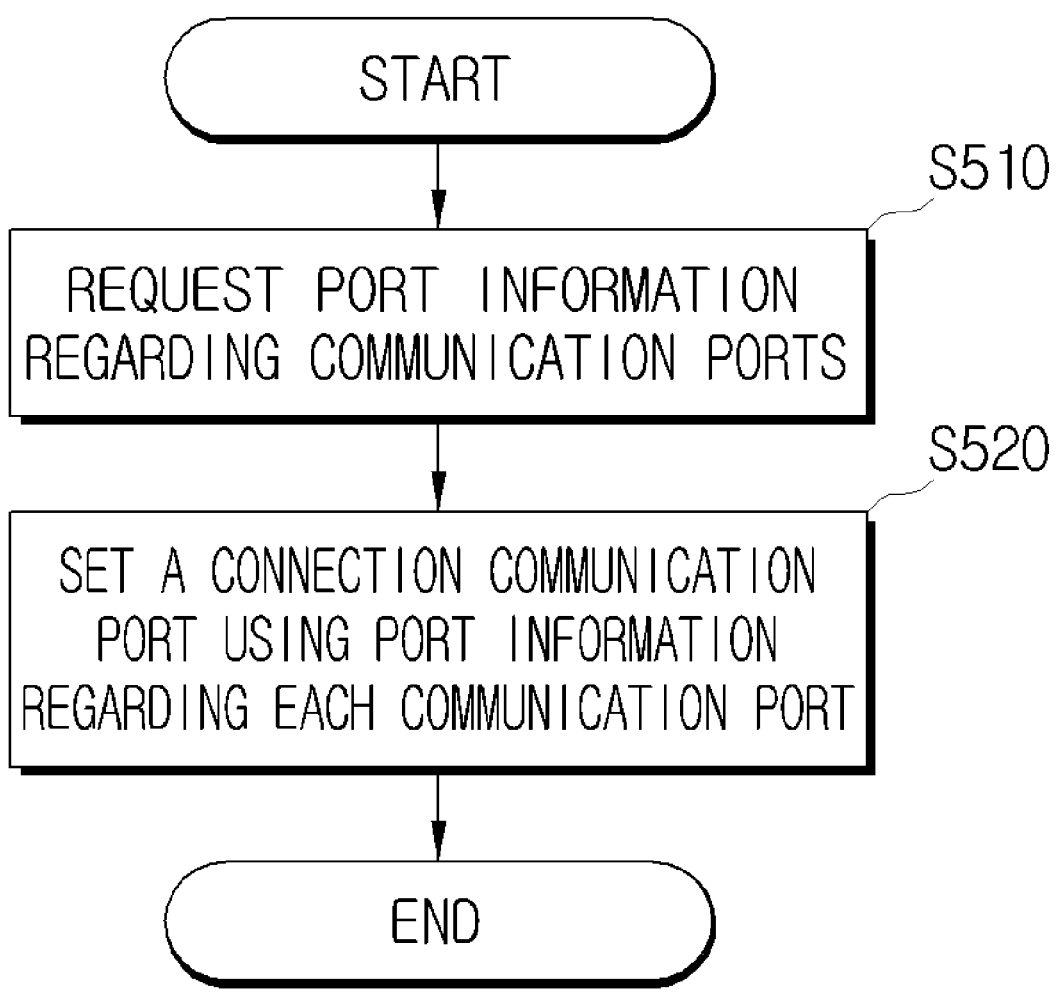
FIG. 5 is a flow chart showing a method to provide a communication port by a host device according to an embodiment of the present invention.

FIG. 5 is a flow chart showing a method to provide a communication port using a host device 100 according to an embodiment of the present invention. With reference to FIG. 5, the host device 100 sends a request to the image forming device 200 for port information regarding a plurality of communication ports in operation S510. The host device 100 sets the communication port having the highest transmission rate as a connection communication port in operation S520.

According to an aspect of the present invention, the port information includes information on the number of communication ports in the image forming device 200, and the IP address, network connectivity state and network transmission rate of each of the communication ports. The request for the port information may be transmitted in the form of the request message 400 written according to a network transmission protocol.

FIG. 6 is a flow chart describing the method shown in FIG. 5 in more detail. With reference to FIG. 6, if print data is received in operation S610, a request message 400 to transmit the print data to the image forming device 200 is generated in order to set a communication port to which the print data will be transmitted in operation S615. The generated request message 400 is transmitted to a pre-connected communication port in operation S620. If a response message 410 responding to the request message 400 is received in operation S625, the IP address of each communication port is detected and stored in operation 630.

Subsequently, request messages 400 are generated and transmitted to each of the stored IP addresses in operation S635. The request messages are transmitted to each of the stored IP addresses according to a predetermined order, such as, for example, an order of the IP addresses.

Alternatively, port information may be transmitted to a server (not shown) which controls the network 10 connecting the host device 100 to the image forming device 200. In this case, the server (not shown) may store the network information, that is, information regarding ports which are connectable between the host device 100 and the image forming device 200.

Next, if a response message 410 responding to the request message 400 is received in operation S640, an RTT is calculated using both the first time information (b) indicating when the request message 400 is transmitted and second time information (c) indicating when the response message is transmitted, which are contained in the response message 410, in operation S645. The RTT of each communication port is matched and stored with the port information of each respective communication port in operation S650.

In operation S655, the communication port having the lowest RTT is set as a connection communication port. If connection to the set connection communication port is cut off in operation S660, the communication port having the next lowest RTT among the stored RTTs is set as a connection communication port in operation S665. Otherwise, if connection to the set connection communication port is not cut off in operation S660, operation S655 is repeated.

FIG. 7 is a flow chart showing a method to provide a communication port for transmission and reception of messages between the host device 100 and the image forming device 200. If the host device 100 receives a command to print data in operation S700, the host 100 transmits a request message 400 to an IP address which matches a preset communication port, for example, communication port 1 (FIG. 1), in operation S710. In operation S720, the image forming device 200 transmits a response message 410 which includes any of various types of information, such as information regarding the time when the response message 400 is transmitted, the number of communication ports, the IP address of each communication port, and whether the communication is wired or wireless communication, i.e., link information, in addition to the received request message 400. Subsequently, an RTT of communication port 1 is calculated and stored using the port information in the transmitted response message 410 in operation S730.

If the number of communication ports is N, operations S710 to S730 for the first to $N^{th}$ communication ports are performed. After an RTT and link information of the $N^{th}$ communication port is calculated and stored in operation S760, the IP address of a communication port having the lowest RTT is selected in operation S770. Then, the print data is transmitted to the image forming device 200 using the IP address of the communication port having the lowest RTT in operation S780.

According to an aspect of the present invention, if there is a plurality of communication ports having RTTs greater than a reference value, the plurality of communication ports is displayed on a screen of the host device 100, and the user can select one of the plurality of communication ports as a connection communication port. However, it is understood that the operation of displaying the plurality of communication ports having RTTs greater than a reference value on a screen may be omitted, and instead the communication port having the lowest RTT is automatically selected.

Accordingly, the print data is transmitted through a communication port having a high-speed transmission rate, thereby increasing transmission efficiency.

As can be appreciated from the above description, users do not need to manually add IP addresses of communication ports since information regarding multi-ports are automatically provided in response to a request message 400.

In addition, since an optimum connection communication port is provided using the information regarding the multi-ports, the network transmission efficiency is increased and user convenience is enhanced.

The foregoing embodiment and advantages are merely exemplary and are not to be construed as limiting the present invention, the definition of which is set forth in the accompanying claims and equivalents thereof. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method to provide a communication port for a host device which is connected to an image forming device having a plurality of communication ports, the method comprising:
   identifying port information including a respective IP address regarding each of the communication ports; and
   setting a connection communication port, through which the host device communicates with the image forming device to perform a printing operation, using the port information regarding each of the communication ports.

2. The method of claim 1, wherein the identifying of the port information comprises:
   requesting the port information from the image forming device or from a server which controls a network connecting the image forming device and the host device and which stores the port information.

3. The method of claim 2, wherein the requesting of the port information comprises transmitting request messages corresponding to the communication ports requesting the port information of the communication ports to the image forming device or the server.

4. The method of claim 2, wherein the port information is requested when the printing operation is initiated, or is requested periodically.

5. The method of claim 1, wherein the setting of the connection communication port comprises setting a communication port having a fastest communication speed from among the communication ports as the connection communication port.

6. The method of claim 1, wherein the setting of the connection communication port comprises:
displaying communication ports which have communication speeds greater than a reference value from among the communication ports; and
selecting one of the displayed ports as the connection communication port.

7. The method of claim 3, wherein a priority indicating which of the communication ports is set as the connection communication port is determined using response messages responding to the corresponding request messages.

8. The method of claim 7, wherein the priority is determined using a round trip time (RTT) of each communication port included in the respective response messages.

9. The method of claim 8, further comprising:
setting a communication port having a lowest RTT among the communication ports as a highest priority to be used as the connection communication port; and
setting a communication port having a next lowest RTT as a next highest priority to be used as the connection communication port if a connection to the set connection communication port having the lowest RTT is cut off.

10. The method of claim 7, wherein each of the response messages comprise the IP address of each of the communication ports, a number of the communication ports, first time information regarding a time when the port information is requested, and second time information regarding a time when the port information is transmitted.

11. A method to provide a communication port for an image forming device which has a plurality of communication ports and is connected to a host device over a network, the method comprising:
receiving request messages corresponding to the communication ports requesting port information including respective IP addresses regarding the communication ports from the host device;
generating response messages containing the port information regarding the communication ports in response to the corresponding request messages; and
transmitting the generated response messages to the host device, wherein the response messages are used to set one of the communication ports as a connection communication port through which the host device communicates with the image forming device to perform a printing operation.

12. The method of claim 11, wherein each of the response messages comprises an IP address of each of the communication ports, a number of communication ports, first time information regarding a time when the port information is requested, and second time information regarding a time when the port information is transmitted.

13. A host device which is connected to an image forming device having a plurality of communication ports, the host device comprising:
a port information identifying unit which identifies port information including respective IP addresses regarding the communication ports of the image forming device; and
a control unit which uses the identified port information to set one of the communication ports as a connection communication port to be used by the image forming device to receive data from the host device and perform a printing operation.

14. The host device of claim 13, wherein the port information identifying unit comprises:
a message processing unit which transmits request messages requesting the port information to the image forming device, or to a server which controls a network connecting the image forming device and the host device and which stores the port information; and
a storage unit which receives and stores response messages sent in response to the transmitted request messages.

15. The host device of claim 14, wherein the message processing unit transmits the request messages requesting the port information when a command to perform the printing operation is input to the host device, or transmits the request messages periodically.

16. The host device of claim 13, wherein the control unit displays communication ports which have communication speeds greater than a reference value from among the communication ports, enables a user to select one of the displayed ports, and sets the selected port as the connection communication port.

17. The host device of claim 14, wherein the control unit determines a priority indicating which of the communication ports is set as the connection communication port using the response messages responding to the request messages.

18. The host device of claim 17, further comprising a calculation unit which calculates a round trip time (RTT) of each of the communication ports using the port information regarding each of the communication ports contained in the corresponding response messages,
wherein the control unit determines the priority of each of the communication ports using the calculated RTTs.

19. The host device of claim 18, wherein the control unit sets a communication port having a lowest RTT among the communication ports as a highest priority to be used as the connection communication port, and sets a communication port having a next lowest RTT as a next highest priority to be used as the connection communication port if a connection to the set connection communication port having the lowest RTT is cut off.

20. The host device of claim 17, wherein each of the response messages comprises an IP address of each of the communication ports, a number of the communication ports, first time information regarding a time when the port information is requested, and second time information regarding a time when the port information is transmitted.

21. A method to provide a communication port for a host device which is connected to an image forming device having a plurality of communication ports, the method comprising:
transmitting a request message from the host device requesting port information including respective IP addresses regarding each of the communication ports;
automatically transmitting a response message comprising the port information regarding each of the communication ports, in response to the request message, to the host device; and
setting one of the communication ports as a connection communication port based on the response message received by the host device.

22. The method of claim 21, wherein the transmitting of the request message comprises transmitting the request message to the image forming device or to a server which controls a network connecting the image forming device and the host device and which stores the port information.

23. The method of claim 22, wherein the automatically transmitting of the response message comprises:
   generating the response message in a message generation unit in response to the request message transmitted from the host device; and
   automatically transmitting the generated response message to the host device using a transmission unit, wherein the message generation unit and the transmission unit are located in one of the image forming device or the server.

24. The method of claim 21, further comprising using the automatically transmitted response message to automatically add IP addresses of each of the communication ports to a driver in the host device which is used to drive the image forming device.

25. The method of claim 21, wherein the setting of the connection communication port comprises:
   using the response message to determine which communication port has a fastest communication speed from among the communication ports; and
   setting the communication port having the fastest communication speed as the connection communication port.

* * * * *